United States Patent [19]

König et al.

[11] 4,248,756

[45] Feb. 3, 1981

[54] THERMOSETTING COATING COMPOSITIONS AND PROCESS FOR THE COATING OF SUBSTRATES

[75] Inventors: Eberhard König, Kronberg; Josef Pedain, Cologne; Hans-Joachim Koch, Leverkusen, all of Fed. Rep. of Germany

[73] Assignee: Bayer Aktiengesellschaft, Leverkusen, Fed. Rep. of Germany

[21] Appl. No.: 111,069

[22] Filed: Jan. 10, 1980

[30] Foreign Application Priority Data

Jan. 19, 1979 [DE] Fed. Rep. of Germany ....... 2902090

[51] Int. Cl.³ .............................................. C08G 18/10
[52] U.S. Cl. ..................... 260/31.2 N; 260/31.6; 260/32.6 N; 260/32.8 N; 427/385.5; 528/45; 528/64
[58] Field of Search ............ 260/31.2 N, 31.6, 32.6 N, 260/32.8 N; 427/385 R; 528/45, 64

[56] References Cited

U.S. PATENT DOCUMENTS

| 3,711,571 | 1/1973 | Farah ..................... 528/45 |
| 3,755,261 | 8/1973 | Van Glick ............................. 528/64 |
| 3,849,360 | 11/1974 | Farah et al. ........................... 528/64 |
| 4,101,473 | 7/1978 | Lander ................................ 528/45 |
| 4,119,602 | 10/1978 | Isgun et al. ................... 260/29.2 TN |
| 4,208,507 | 6/1980 | Stutz et al. ............................ 528/64 |

FOREIGN PATENT DOCUMENTS

| 2462317 | 12/1976 | Fed. Rep. of Germany . |
| 2094058 | 2/1972 | France . |
| 970459 | 9/1964 | United Kingdom . |
| 1085455 | 10/1967 | United Kingdom . |
| 1414847 | 11/1975 | United Kingdom . |

OTHER PUBLICATIONS

Verhanik, Lecture, Congress of the Leather Industry, 18, Budapest, Oct. 22, 1978, pp. 1279-1288.

*Primary Examiner*—Maurice J. Welsh
*Attorney, Agent, or Firm*—Gene Harsh; Lawrence S. Pope; Thomas W. Roy

[57] ABSTRACT

The present invention relates to thermosetting two-component coating compositions containing
(A) a prepolymer having an average molecular weight of from 1,000 to 15,000 having an average of from 2 to 4 ketoxime-blocked aromatic isocyanate groups;
(B) a crosslinking agent corresponding to the following general formula:

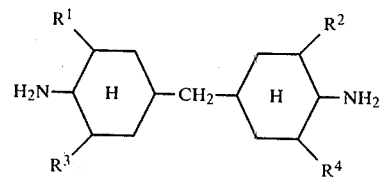

wherein $R^1$, $R^2$, $R^3$ and $R^4$ independently represent hydrogen or $C_1$- to $C_3$-alkyl groups with the proviso that if $R^1$ to $R^4$ all are hydrogen, 75% of the diamine have the cis,cis-structure and optionally
(C) pigments, fillers blowing agents or other known additives. The equivalent ratio of blocked isocyanate groups to $NH_2$ groups is from about 1.35:1 to about 0.95:1, and the coating composition contains not more than about 15% by weight of organic solvents and is free from aqueous polymer dispersions or solutions. The coating compositions may be applied to substrates by the direct or reverse process and may be applied as a top coat, adhesive coat or foam coat.

9 Claims, No Drawings

THERMOSETTING COATING COMPOSITIONS AND PROCESS FOR THE COATING OF SUBSTRATES

BACKGROUND OF THE INVENTION

1. Field of the Invention

This invention relates to solvent-free or low-solvent coating compositions which harden to form polyurethanes and to the use thereof for the coating of substrates, in particular textiles.

2. Description of the Prior Art

The coating of textiles with polyurethane urea solutions containing up to 70%, by weight, of solvents is known. Either completely reacted polyurethane ureas or those which require a second component for subsequent crosslinking in order to achieve the coating properties thereof may be used for this purpose. Coating compositions of the last-mentioned type have been described, for example, in U.S. Pat. No. 3,711,571, according to which the dissolved polyurethane ureas are mixed with oxime-blocked isocyanate prepolymers and cured during a heat treatment in a drying channel. This method of coating has the disadvantage of requiring at least 50%, by weight, of solvents (not counting the quantity of blocking agent).

Other polyurethane urea coating compositions, which do not require solvent, have been disclosed in U.S. Pat. No. 3,755,261 and in German Offenlegungsschrift No. 2,462,317. These are thermosetting mixtures of liquid isocyanate prepolymers and a latent hardener based on salts of 4,4'-diaminodiphenylmethane ("MDA"). The latent hardener may be liquefied by suspending the MDA salt complex in at least 50%, by weight, of a PVC plasticizer of the phthalic acid ester type. According to the examples given, the isocyanate prepolymers contain a relatively high proportion of free diisocyanates.

Such a coating system has disadvantages in the physiological field. The relatively high free diisocyanate content and particularly the toxicity of MDA used as a constituent of the latent hardener are problematic. A further disadvantage of such coatings is the plasticizer content thereof. Due to "blooming" or "bleeding" of the plasticizer, dry top coats having perfect surfaces are unobtainable.

In British Pat. No. 970,459, there is described a process for bonding a foam foil to a textile substrate. The adhesive coating used is a reactive mixture consisting substantially of ketoxime-blocked isocyanate prepolymer and N,N,N',N'-tetrakis-(2-hydroxypropyl)-ethylene diamine as crosslinking agent. Since this system is cured via the urethane groups and not via urea groups, the end products are soft films which are not suitable for the production of top coats.

According to publication by J. Verhanik (publication of lectures held at the Congress of the Leather Industry, 18-22.10.78 in Budapest, pages 1279 to 1288, OMKDK-Technoinform 1428; Budapest Postbox 12) concerning a "thermoactive, solvent-free PUR system", polyether based isocyanate prepolymers which are blocked with phenol groups may be worked-up with polyether amines having molecular weights of approximately 750 to produce foam coatings. Apart from the toxic effect of the phenol blocking agent when released, this system has the disadvantage that it is restricted to a very narrow field of application on account of its mechanical properties.

It was, therefore, an object of the present invention to overcome the disadvantages mentioned above and provide a solvent-free or low solvent, physiologically harmless coating system which would fulfill the technical requirements of any coating component used, for example, for an adhesive coat, foam coat or top coat, including also a fusible top coat which may be welded.

This problem could be solved by using the coating composition described below.

BRIEF DESCRIPTION OF THE INVENTION

The present invention relates to thermosetting two-component coating systems containing:

(A) a prepolymer having an average molecular weight of from about 1,000 to 15,000, preferably from about 2,000 to 8,000, having an average of from 2 to 4, preferably from 2 to 3, ketoxime-blocked aromatic isocyanate groups;

(B) a crosslinking agent corresponding to the following general formula:

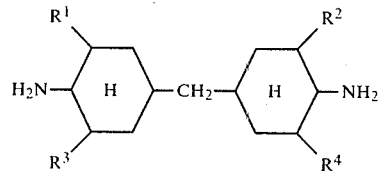

wherein $R^1$ to $R^4$ independently represent hydrogen or a $C_1$-$C_3$-alkyl group with the proviso that if $R^1$ to $R^4$ all represent hydrogen atoms, the diamine contains at least 75% of the cis,cis-isomer; and, optionally, (C) pigments, fillers, blowing agents and other known additives;

wherein the equivalent ratio of blocked isocyanate groups to $NH_2$ groups is from about 1.35:1 to about 0.95:1, preferably from about 1.25:1 to about 1:1, and the coating compound contains not more than about 15% by weight, preferably not more than about 10% by weight of organic solvents and is free from aqueous polymer dispersions or polymer solutions such as those described in German Offenlegungsschrift No. 28 14 079.

The present invention also relates to a direct or reversal process for the coating of substrates with thermosetting two-component coating systems based on polyurethane, characterized in that the coating compounds according to the present invention are used as top coat, adhesive coat or foam coat.

DETAILED DESCRIPTION OF THE INVENTION

The isocyanates used for the synthesis of the ketoxime-blocked isocyanate prepolymers may be aromatic polyisocyanates, such as those described in detail in U.S. Pat. Nos. 3,984,607 and 4,035,213, German Offenlegungsschrift No. 2,402,840 and German Auslegeschrift No. 2,457,387. 2,4'- and 4,4'-diisocyanatodiphenylmethane, tolylene diisocyanate isomers and, in particular, mixtures of these diisocyanates are preferred according to the present invention.

Suitable reactants for these polyisocyanates to produce the isocyanate prepolymers include polyhydroxyl compounds having a molecular weight of from about 500 to 10,000, preferably from about 1,000 to 6,000, having from 2 to 8, preferably 2 or 3, hydroxyl groups, such as those described in detail in the above-mentioned publications.

The polyhydroxyl compounds preferably used according to the present invention include propylene oxide polyethers which have an average of from 2 to 3 hydroxyl groups and may also contain polyethylene oxide units as well as hydroxypolyesters having an average molecular weight of from about 1,000 to 6,000 which have 2 or 3 OH end groups and melt at temperatures below 60° C.

Particularly preferred according to the present invention are mixtures of the above-mentioned hydroxypolyethers with hydroxypolyester of adipic acid, hexane diol-(1,6) and neopentyl glycol having an average molecular weight of from about 1,000 to 3,000.

Low molecular weight polyols having a molecular weight of less than about 300, such as those known as crosslinking agents, may possibly also be used in the preparation of the isocyanate prepolymers. Among these low molecular weight polyols, those which are preferred according to the present invention include butane diol-(1,4) and trimethylol propane.

Preparation of the isocyanate prepolymers is carried out in known manner by reacting the above-mentioned polyhydroxyl compounds with excess diisocyanate, preferably at from about 70° to 110° C., generally using an NCO/OH ratio of from about 1.5:1 to 6.0:1, preferably from about 1.7:1 to 2.5:1.

Suitable blocking agents for the isocyanate prepolymers include, for example, ketoximes of hydroxylamine and ketones, such as acetone, methyl ethyl ketone, diethyl ketone, cyclohexanone, acetophenone and benzophenone.

A preferred blocking agent according to the present invention is methyl ethyl ketoxime (butanone oxime).

The blocking reaction is carried out by reacting the isocyanate prepolymer with stoichiometric quantities of ketoxime at elevated temperatures, e.g. at from about 70° to 100° C., until the isocyanate groups disappear.

The blocked isocyanate prepolymers may be mixed with up to about 15% by weight, preferably up to about 10% by weight, based on the blocked isocyanate prepolymer, of organic solvents to adjust them to the optimum processing viscosity of from about 20 to 40,000 mPas at 20° C. Since the isocyanate groups are blocked, the solvents used need not necessarily be inert towards isocyanate groups. For example, the solvents used may be isopropanol, ethylene glycol monomethyl ether and ethylene glycol monoethyl ether and the acetic acid esters thereof, methyl ethyl ketone, cyclohexanone, butyl acetate or DMF.

According to the present invention, the crosslinking component used for the blocked isocyanate prepolymer is preferably 4,4'-diamino-3,3'-dimethyldicyclohexylmethane, which is an aliphatic diamine having a very low vapor pressure which is liquid at room temperature. Examples of other diamines include 4,4'-diaminodicyclohexylmethane (at least 75% of the diamine being the cis-cis-isomer), 4,4'-diamino-3,3',5,5'-tetramethyldicyclohexylmethane and the homologous tetraethyl, tetrapropyl and tetraisopropylderivatives, 4,4'-diamino-3,5-dimethyl-3',5'-diethyl-dicyclohexylmethane and 4,4'-diamino-3,3'-diisopropyl-dicyclohexylmethane.

The blocked isocyanate prepolymers and diamine crosslinking agents are generally mixed in proportions of the equivalent weights thereof, although less than complete crosslinking may be suitable for certain purposes, so that the equivalent ratio of blocked NCO to $NH_2$ used according to the present invention is generally from about 1.35:1 to about 0.95:1, preferably from about 1.25:1 to about 1:1.

The reactive mixtures according to the present invention may be mixed with known additives, such as pigments, UV-stabilizers, levelling agents, antioxidants, fillers or blowing agents, to produce the finished coating compounds ready for use.

The thermosetting reactive mixtures may be used to produce coatings by the direct or reversal coating process in the conventional coating installations. Coatings having differing properties, e.g. adhesive coats, foam coats or top coats, may be produced according to the particular specific chemical structure of the isocyanate prepolymer.

For reversal coating by the process according to the present invention, the reactive mixture for the top coat is applied in a quantity of from about 30 to 100 $g/m^2$ to a suitable intermediate support, e.g. a separating paper, and hardened in a drying channel. The reactive mixture for the adhesive coat is then applied to the dry top coat, again in a quantity of from about 30 to 100 $g/m^2$, the substrate is laminated to it and the coating is cured in another drying channel at from about 120° to 190° C., preferably from about 140° to 170° C., and the coated substrate is then removed from the separating support. One could, of course, equally well use the coating compounds according to the present invention only for producing the top coat or the adhesive coat and use a conventional coating system for the other coat.

As mentioned above, the reactive mixtures may also be applied directly to the textile substrate by the direct coating process. The solvent-free or low solvent character of the coating compounds according to the present invention is a great advantage in this method for the production of thick coatings having an even surface. By applying the mixtures in quantities of from about 100 to 200 $g/m^2$, technical coatings about 0.4 mm in thickness may be produced by this method in only a few stages.

If the coating compositions according to the present invention are required for the production of foam layers, compounds which release gas when heated are added as blowing agents and foam stabilizers are also preferably added. Suitable additives have been described, for example, in German Offenlegungsschrift No. 1,794,006 (British Pat. No. 1,211,339) and in U.S. Pat. No. 3,262,805.

The known PUR reactive systems could generally only be used for the production of interlayers, for example, adhesive layers or foam layers. When the systems were used for the production of top coats, the defects mentioned above were encountered, such as insufficiently dry hand or physiologically undesirable properties of the starting components. From the wide range available in the known art, it was not to be expected that the particular reactive system obtained by the process according to the present invention would also be able to be used for the production of top coats for coating textiles. It was, therefore, surprising to find that top coatings comparable to those obtainable from PUR solutions in the mechanical properties thereof could also be produced according to the present invention.

The advantage of the process according to the present invention compared with the known art also lies in the fact that the starting components used are, according to our present state of scientific knowledge, physiologically harmless.

The following Examples illustrate the present invention.

EXAMPLES

Preparation of Blocked Isocyanate Prepolymers

Prepolymer A 4,000 g of a hydroxyl polyether having a molecular weight of 6,000 based on trimethylol propane and propylene oxide and 275 g of a hydroxyl polyether having a molecular weight of 550 based on bisphenol A and propylene oxide are reacted with 375 g of 4,4'-diisocyanatodiphenylmethane and 261 g of 2,4-diisocyanatotoluene at from 80° to 90° C. until the isocyanate content is just below the calculated amount of 2.56% by weight. The mixture is then stirred into 261 g of butanone oxime at from 60° to 70° C. No isocyanate may be detected by IR spectroscopy after about 20 minutes. The blocked isocyanate prepolymer, a clear colorless liquid having a viscosity of about 50,000 mPas at 20° C., has a determinable latent isocyanate content of 2.34% by weight, and hence an isocyanate equivalent weight of 1,800.

Prepolymer B 2,000 g of a polyether having a molecular weight of 6,000 based on trimethylol propane and propylene oxide, 1,000 g of a linear polyether having a molecular weight of 1,000 based on propylene glycol and propylene oxide, 1,450 g of a linear polyester having a molecular weight of 1,700 based on hexane diol-(1,6), neopentyl glycol and adipic acid and 22.5 g of butane diol-(1,4) are reacted with 1,125 g of 4,4'-diisocyanatodiphenylmethane and 174 g of 2,4-diisocyanatotoluene at from 80° to 90° C. for about 3 hours, until the isocyanate content is just below the calculated content of 4.26% by weight. 496 g of butanone oxime and 696 g of ethylene glycol monomethyl ether acetate are then rapidly stirred in at from 60° to 70° C. No isocyanate may be detected IR spectroscopically after 20 minutes. The blocked isocyanate prepolymer, a colorless clear liquid having a viscosity of about 40,000 mPas at 20° C., has a determinable latent isocyanate content of 3.3% by weight, and hence an isocyanate equivalent weight of 1,280.

Prepolymer C 2,000 g of a hydroxyl polyester having a molecular weight of 1,700 based on hexane diol-(1,6), neopentyl glycol and adipic acid are reacted with 358 g of 2,4-diisocyanatotoluene at from 80° to 90° C. until the isocyanate content is 4.25% by weight. 174 g of butanone oxime and 250 g of ethylene glycol monomethyl ether acetate are then rapidly stirred into this prepolymer at 70° C. No isocyanate groups may be detected IR spectroscopically after about 20 minutes. The blocked isocyanate prepolymer, a colorless clear liquid having a viscosity of about 40,000 mPas at 20° C., has a determinable latent isocyanate content of 3.5% by weight, and hence an isocyanate equivalent weight of 1,200.

EXAMPLE 1

This Example illustrates the production of a textile coating consisting of a cotton substrate, an adhesive coat and a top coat by the reversal process.

The paste used for the adhesive coat consists of 1,800 g of prepolymer A and 119 g (i.e. an equimolar quantity) of 4,4'-diamino-3,3'-dimethyl-dicyclohexylmethane. Its viscosity at room temperature is about 30,000 mPas and remains unchanged for at least 2 weeks.

The paste for the top coat comprises 1,280 g of prepolymer B and 119 g (i.e. an equimolar quantity) of 4,4'-diamino-3,3'-dimethyl-dicyclohexylmethane. In addition, it contains 10% by weight of a commercial pigment triturate, 0.2% by weight of silicone oil and 2% by weight of a silicate filler. The viscosity of this paste when ready for use is about 40,000 mPas at room temperature.

This top coat is applied to a separating paper in a thickness corresponding to 70 g/m² by means of a roller applicator in a coating machine equipped with two coating tools and the paste is then cured in a drying channel at from 140° to 160° C. for 2 minutes. The paste for adhesive coat described above (applied at 60 g/m²) is applied in a similar manner to the cured top coat by means of the second coating tool. The textile web, a napped cotton fabric, is then laminated to it. The adhesive coat is subsequently cured at from 140° to 160° C. for from 2 to 3 minutes in the second drying channel.

The coating has a dry, soft hand having a surface hardness in the region of Shore A 80. It has good folding resistance, resistance to chemical dry cleaning agents and resistance to hydrolysis.

EXAMPLE 2

A textile coating is prepared consisting of a cotton substrate and an adhesive coat, foam coat and top coat by the reversal process.

The pastes for the adhesive coat and the top coat have the same composition as described in Example 1.

The paste for the foam coat comprises 1,280 g of prepolymer B and 119 g (i.e. an equimolar quantity) of 4,4'-diamino-3,3'-dimethyl-dicyclohexylmethane. In addition, it contains 1,5% by weight of diphenyl-3,3'-disulphone hydrazide as blowing agent, 0.2% by weight of silicone oil and 2% by weight of a silicate filler. The viscosity of this paste, when ready for use, is about 40,000 mPas at room temperature.

Using the second coating tool in the coating machine described in Example 1, the top coat paste is applied to a separating paper in a quantity of 60 g/m² and the paste is hardened in the following drying channel at from 140° to 160° C. for from 1 to 3 minutes, depending on the efficiency and arrangement of the nozzles in the drying channel. The crosslinked top coat is rolled together with the separating paper. After this operation, the top coat on the separating paper is returned to the beginning of the coating machine. The paste for the foam coat is applied to the top coat in a quantity of 180 g/m² using the first coating tool and the paste is foamed in the drying channel at from 140° to 160° C. and crosslinked. In the second coating tool, the paste for the adhesive coat is applied to the foam layer in a quantity of 60 g/m², using a coating knife. The textile web, an unnapped cotton fabric, is then added by laminating. After further curing in the drying channel and passage through the cooling rollers, the coating is stripped off the separating paper and rolled up. The coating has a dry and soft hand. Its folding strength is very high, even after the aging test by hydrolysis at 90° C.

EXAMPLE 3

Preparation of a thick, weldable coating for a tarpaulin, using the direct coating process.

The paste for the adhesive coat comprises 1,280 g of prepolymer B and 102 g of 4,4'-diamino-3,3'-dimethyl-dicyclohexlmethane. It contains the reactive components in an equivalent ratio of $NCO/NH_2 = 1.25:1$. In addition, the paste contains 2% by weight of a silicate filler, 0.5% by weight of silicone oil and 10% by weight of a PVC plastisol.

The top coat paste comprises 1,200 g of prepolymer C and 119 g (i.e. an equimolar quantity) of 4,4'-diamino-3,3'-dimethyl-dicyclohexylmethane. In addition, the top coat paste contains 10% by weight of a ground pigment powder and 2% by weight of silicone oil. The paste when ready for use has a viscosity of about 40,000 mPas at room temperature.

Using a coating machine of the type mentioned in Examples 1 and 2, the paste for adhesive coats described above is applied to a polyester textile web in a quantity of 100 g/m² by means of the first roller coater. This adhesive coat is cured in the following drying channel at from 140° to 160° C. The top coat paste is applied to this adhesive coat in a quantity of 200 g/m² in the second coating tool and cured in the second drying channel in the manner described above.

The coating process described here may, if necessary, also be used for coating the undersurface of the tarpaulin.

The tarpaulin is obtained in a thickness of about 0.3 mm and has good resistance to light and weathering. Its folding strength is very high. The tarpaulin may be welded both by heat and by high frequency.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A thermosetting coating composition comprising
   (A) a prepolymer having an average molecular weight of from about 1,000 to 15,000 having an average of from 2 to 4 ketoxime-blocked aromatic isocyanate groups;
   (B) a cross-linking agent corresponding to the following general formula:

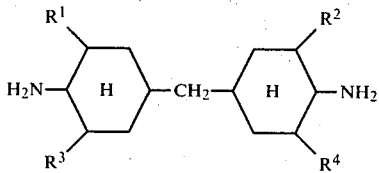

wherein $R^1$, $R^2$, $R^3$ and $R^4$ independently represent hydrogen or an alkyl group with 1 to 3 carbon atoms, with the proviso that if $R^1$ to $R^4$ all represent hydrogen, the amount of cis,cis-isomer in the diamine is at least 75%,
   wherein the equivalent ratio of blocked isocyanate groups to $NH_2$ groups is from about 1.35:1 to about 0.95:1 and the coating compound contains a total of not more than about 15% by weight of organic solvents and is free from aqueous polymer dispersions or aqueous polymer solutions.

2. A coating composition according to claim 1, characterized in that component (A) has an average molecular weight of from about 2,000 to 8,000.

3. A coating composition according to claims 1 or 2, characterized in that diphenylmethane diisocyanate and/or tolylene diisocyanate are used for the preparation of component (A).

4. A coating composition according to claims 1 or 2, characterized in that a polyether having a molecular weight of from about 500 to 10,000 having from 2 to 3 hydroxyl groups and/or a polyester having a molecular weight of from about 1,000 to 6,000 having from 2 to 3 hydroxyl groups are used for the preparation of component (A).

5. A coating composition according to claim 4, characterized in that a propylene oxide polyether having a molecular weight of from about 1,000 to 6,000 having from 2 to 3 hydroxyl groups and optionally also ethylene oxide units and/or a polyester from adipic acid, hexane diol and neopentyl glycol having a molecular weight of from about 1,000 to 3,000 having from 2 to 3 hydroxyl groups are used for the preparation of component (A).

6. A coating composition according to claims 1 or 2, characterized in that the isocyanate groups of component (A) are blocked with methyl ethyl ketoxime.

7. A coating composition according to claims 1 or 2, characterized in that component (B) is 4,4'-diamino-3,3'-dimethyl-dicyclohexylmethane.

8. A coating composition according to claims 1 or 2, which also contains pigments, fillers, blowing agents or other known additives or mixtures thereof.

9. A process for the direct or reversal coating substrates using thermosetting two-component coating systems based on polyurethane as top coat, adhesive coat or foam coat, characterized in that the coating compositions according to claims 1 or 2 are used.

* * * * *